United States Patent [19]

Soehner et al.

[11] Patent Number: 4,986,096
[45] Date of Patent: Jan. 22, 1991

[54] ACCESS COVER SECURITY DEVICE

[76] Inventors: William Soehner, 135 Oceanview Rd., East Rockaway, N.Y. 11518; Edward Wilber, 346 Fern St., South Hempstead, both of N.Y. 11550

[21] Appl. No.: 404,096
[22] Filed: Sep. 7, 1989
[51] Int. Cl.$^5$ ............................................. B65D 55/14
[52] U.S. Cl. ........................................ 70/54; 70/164; 220/3.8; 220/210; 248/228; 248/553
[58] Field of Search ....................................... 70/54–56, 70/34, 163, 164, 158; 439/133; 220/210, 325, 3.8; 248/228, 231.7, 553, 546

[56] References Cited
U.S. PATENT DOCUMENTS

| | | | |
|---|---|---|---|
| 607,989 | 7/1898 | Erickson et al. | 220/3.8 X |
| 3,714,802 | 2/1973 | Morse et al. | 70/34 |
| 3,968,985 | 7/1976 | Nielsen, Jr. et al. | 70/63 X |
| 4,031,722 | 6/1977 | Michelman et al. | 70/63 |
| 4,096,718 | 6/1978 | Michelman et al. | 70/54 X |
| 4,167,196 | 9/1979 | Morris | 220/3.8 X |
| 4,254,647 | 3/1981 | Finck, Jr. | 70/164 X |
| 4,289,000 | 9/1981 | Nielsen, Jr. | 70/34 |
| 4,331,012 | 5/1982 | Swisher | 70/164 |

Primary Examiner—Lloyd A. Gall
Attorney, Agent, or Firm—Kenyon & Kenyon

[57] ABSTRACT

An apparatus for securely locking an access cover to a housing, the housing defining an interior volume, comprising a bracket adapted to be attached at a point substantially within the interior volume of the housing, the bracket including fastening means inaccessible from the exterior of the housing once the access cover is mounted to the housing, the access cover comprising a member disposed thereon having a bore therein defining a longitudinal extent, the longitudinal extent of the bore being disposed substantially perpendicularly to the plane of the access cover, the bore of the member adapted to receive a lock having locking means thereon, the lock further being received in a bore of the bracket in alignment with the bore of the member once the access cover is mounted to the housing, the locking means being received on a side of the bracket opposite the member. The apparatus is especially adapted for protecting the housings containing electrical connections for electrical utility meters.

22 Claims, 2 Drawing Sheets

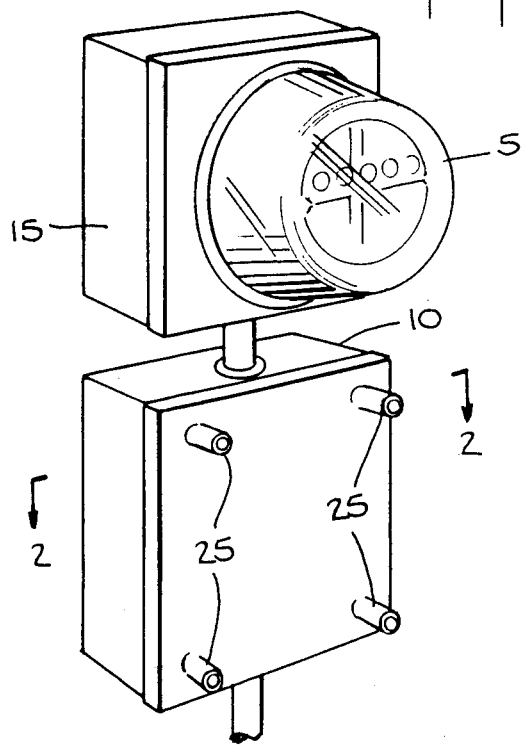
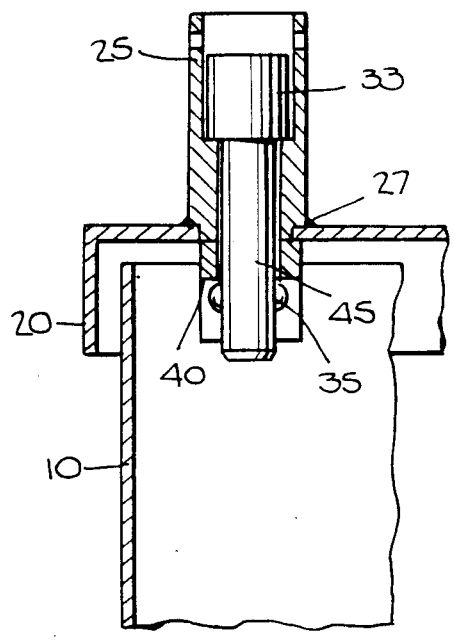
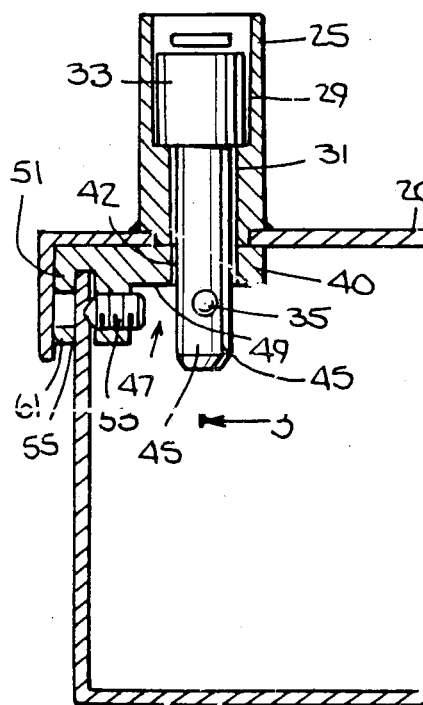
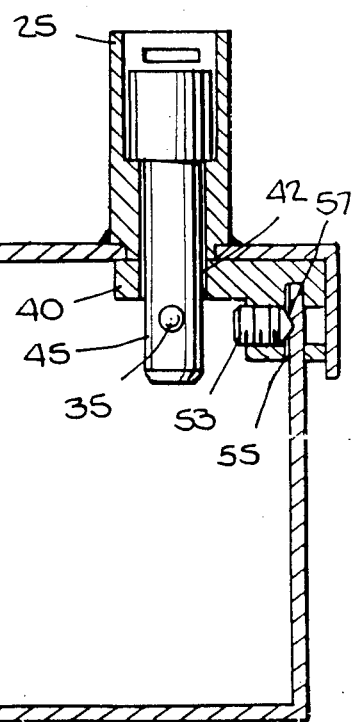

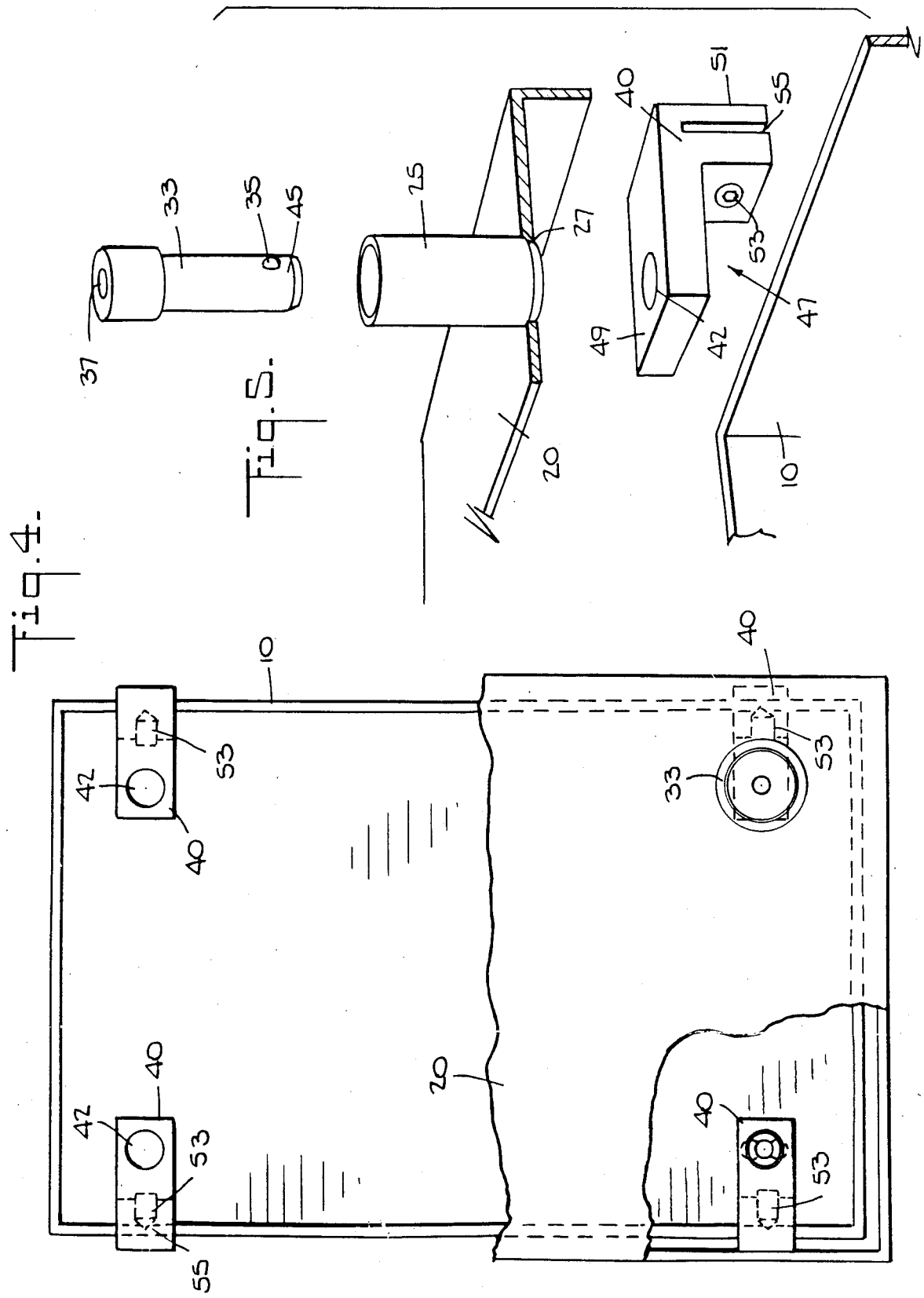

ACCESS COVER SECURITY DEVICE

BACKGROUND OF THE INVENTION

The present invention relates to a locking security device, and in particular, to a security device for protecting utility meters, and even more particularly, for protecting the electrical connections contained in a housing leading to an electrical utility meter.

In the past, electric utility meters have been mounted in metal housings, such that the meter is mounted either in a separate housing or attached to another housing in which electrical connections, often including switches and circuit protection components, are disposed. Electrical utilities have had the problem that unscrupulous persons have often pried open the locked exteriors of these housings in order to circumvent operation of the electrical meter by suitably placing short circuit connections to by-pass the electrical meter.

An example of a prior art arrangement for preventing tampering with electrical meters is shown in U.S. Pat. No. 4,313,319 to Haus, Jr. et al. In this patent, a heavy locking cylinder is attached to the metal housing containing the electrical meter or wiring for the electrical meter. The locking cylinder is bolted to the metal housing and contains a machined hole therethrough for receipt of a lock. The locking cylinder is further received in an exterior mounted rectangular body having two-cylindrical intersecting bores, one for receiving the locking cylinder extending through a hole in the housing and the other for receiving a cylindrical lock member which is removable with a key. The locking cylinder which mounts through an opening in the housing is received in one bore of the rectangular body, such that when the cylinder lock is received in the other bore, the cylinder lock passes through or intersects the opening in the locking cylinder. The key for removing the cylinder lock and the cylinder lock itself disclosed in the '319 patent are also disclosed in further detail in U.S. Pat. Nos. 4,155,232 and 4,040,279.

The locking device disclosed in the '319 patent has met with wide acceptance by utility companies for securing electrical meters. The device of the '319 patent, however, has serious disadvantages. First, the device of the '319 patent requires that relatively large holes be cut, drilled, or punched into the housing holding the electrical meter or the connections to the electrical meter. Secondly, because of the time-consuming requirement for drilling, boring or punching holes in the housing, typically only one such lock is utilized on a particular housing. As a result, the housings still can be pried open at portions of the box disposed at a distance from the location of the locking device, i.e., at a corner of the box removed from the location of the locking device. Furthermore, the device of the '319 patent, in addition to being defeatable and relatively expensive and time-consuming to mount on the housing, is also relatively expensive, since it is for the most part exposed, and thus must be made of heavy gauge materials.

SUMMARY OF THE INVENTION

It is an object of the present invention to provide a means for securely locking access covers to housings.

It is yet still a further object of the present invention to provide a security device for locking access covers to utility meter housings.

It is yet still a further object of the present invention to provide a security device for locking access covers to housings containing the electrical connections for electrical utility meters.

It is yet still a further object of the present invention to provide such a locking device which utilizes the cylindrical lock described in the above-mentioned U.S. Pat. Nos. 4,313,319, 4,155,232 and 4,040,279, commonly used in the locking of utility meter housing covers.

It is yet still another object of the present invention to provide such a locking device for electrical utility meters which allows for only a bare minimum of components to be exposed outside of the housing.

It is yet still a further object of the present invention to provide an inexpensive, easily attachable locking device for utility meter housings.

It is yet still a further object of the present invention to provide a security lock for utility meter housings which does not take up space on the sides or above or below the housing and thus is suitable in applications where a large number of such meter housings are located in close adjacent relationship.

It is yet still an additional object of the present invention to provide such a locking device for electric utility meters which is especially useful for a large number of older style meters wherein the electric meter is disposed above, below or to one side of the housing containing the electrical connections and/or circuit protection components for or leading to the electrical utility meter.

The above and other objects of the present invention are achieved by a locking device for an access cover to a housing, the housing defining an interior volume, comprising a bracket adapted to be attached at a point substantially within the interior volume of the housing, the bracket including fastening means inaccessible from the exterior of the housing once the access cover is mounted to the housing, the access cover including a member disposed thereon having a bore therein defining a longitudinal extent, the longitudinal extent of the bore disposed substantially perpendicularly to the plane of the access cover, the bore of the member adapted to receive a lock having locking means thereon, the lock further being received in a bore of the bracket in alignment with the bore of the member once the access cover is mounted to the housing, the locking means being received on a side of the bracket opposite the member and securing the access cover to the bracket.

BRIEF DESCRIPTION OF THE DRAWINGS

The invention will be described in greater detail in the following detailed description with reference to the drawings, in which:

FIG. 1 shows a housing for electrical connections leading to an electric utility meter, the housing being suitably modified in accordance with the present invention;

FIG. 2 is a cross-sectional view along lines 2,2 of FIG. 1 showing the present invention;

FIG. 3 is a cross-sectional view taken along lines 3,3 of FIG. 2 showing the apparatus of the present invention;

FIG. 4 is a cut-away top view showing the present invention; and

FIG. 5 is an exploded prospective view showing the components according to the present invention.

DETAILED DESCRIPTION

With reference now to the drawings, the present invention is especially useful for protecting the housings containing the electrical connections for an electrical utility meter. These housings may also comprise circuit protection components, such as fuses, for protecting the load connected to the electric utility mains. With reference to FIG. 1, particularly in older buildings, having older style electric utility meters, the meter 5 is disposed above, below or to the side of a housing 10 containing the electric connections leading to the meter and typically, circuit protection components. The meter 5 may also be mounted in a separate housing 15 as shown, or the housing 15 for the electrical utility meter can be physically attached or integral with the housing 10 for the electrical connections leading to the meter. In a typical application, as shown, the housing 10 includes a rectangular cover providing access to the interior of the housing In FIG. 1, a cover 20 for the housing 10 is shown, but the cover 20 comprises a cover especially modified in accordance with the present invention including locking cylinder members 25 disposed at each corner thereof for locking the cover to the housing.

In accordance with the invention, the cover 20 of the housing is preferably not modified on site to include the cylinder members 25. Instead, the original housing cover 20, which may be hinged to the housing 10, preferably is removed by the utility personnel on site, and a new housing cover 20 including cylinder members 25 is mounted to the housing 10. Of course, cover 20 could also be modified on site, if desired.

With reference now to the remaining figures, the cover 20 for the housing 10 is preferably provided with 4, although a lesser number can be used, cylinder members 25. The cylinder members 25 are preferably welded to the cover 20 at 27 by suitable means such as electric arc welding, inert gas welding or spot welding. The welding can be done on either or both the outer or inner surfaces of the cover 20. The cylinder members 25 are provided, as shown more particularly in FIG. 2, with a bore or aperture having two inner diameters, a larger inner diameter 29 and a smaller inner diameter 31. The cylinder member 25 is machined in this way in order to receive a lock 33 in accordance with the above-identified U.S. patents, which includes locking ball members 35 which are retracted in accordance with the above-identified patents by a suitable key inserted into an opening 37 contained at the upper surface of the lock 33. Other locks can also be utilized, as apparent to one of skill in the art.

In accordance with the invention, a plurality of brackets 40 are attached to housing 10. These brackets 40 may be suitably machined or cast, but should be made of a high strength material. The brackets 40 have a bore 42 for receiving the end of lock 33. In particular, this bore 42 is sized so as to receive the smaller outer diameter portion 45 of lock 33, with the locking balls 35 being received in the interior-angled portion 47 formed by two legs 49 and 51 of the bracket 40. As shown in the drawings, the bracket 40 includes a fastener 53 disposed in a suitable opening in leg 51. Leg 51 also includes a slotted recess 55 which receives an edge of the housing 10 as shown in FIGS. 2 and 4. Fastener 53 preferably comprises an Allen-type screw received in threads disposed in the opening for fastener 53 in the bracket 40. The screw 53 preferably comprises a set screw having a pointed end 57, which is adapted to make an impression in the side of the metal housing 10 received in slotted recess 55, thus securely fastening the bracket 40 to the housing 10. Preferably, a bracket 40 is mounted in this manner to the four corners of the housing 10, as shown particularly in FIG. 4.

Once the brackets 40 are physically attached to the housing 10, the cover plate 20 is mounted over the housing 10. The cover plate 20 is suitably sized so that it is slightly larger than the original cover plate to accommodate the thickness of the portions 61 of the brackets 40. Furthermore, a suitable template can be provided with the kit of components for mounting the modified cover 20 to the housing 10 such that the brackets 40 may be mounted so as to be properly aligned with the bores in the cylinder members 25 disposed on the access cover 20. As shown in the figures, once the cover plate is mounted on the housing 10 to which the brackets 40 have been attached, locks 33 are disposed in each of the bores of the cylinder members 25, thus securing the access cover 20 to the housing 10.

In accordance with the invention, the access cover 20 is securely fastened to the housing 10 with a minimum of tools, preferably with no cutting, drilling or punching necessary, since the new cover plate 20 is prepared in advance and carried to the site by the utility personnel for modifying the housing 10 in order to lock the access cover 20 to the housing. Furthermore, because the locking device does not take up space on the sides or above or below the housing, it is suitable for applications where a plurality of such housings are located in close adjacent relationship and a lock disposed on the sides or above or below the housing would interfere with other housings. Additionally, because the brackets 40 are mounted internally, it is not possible for a person to obtain access to the brackets without cutting through the housing 10 or the cover 20. Furthermore, because the present invention preferably uses four locking devices, one in each corner, although a lesser number can be used, it is not possible to pry one corner of the access cover 20 open, as has been done with past locking devices, in particular, the locking device shown in the above-described U.S. Pat. No. 4,313,319. The brackets 40 are securely fastened to the housing 10 by the set screws 53 having pointed tips for imbedding in the housing metal 10. Brackets 40 so securely fasten the access cover 20 to the housing 10 once a lock 33 is inserted in each of the cylinder members 25 that if an attempt is made to pry off the cover 20, using, for example a crow bar or a large screw driver, typically, the entire housing 10 will be ripped away from the wall to which the housing is attached.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for securely locking an access cover to a housing, the housing defining an interior volume, comprising:

a bracket adapted to be attached at a point substantially within the interior volume of the housing, the bracket including fastening means inaccessible from the exterior of the housing once the access cover is mounted to the housing, said bracket comprising an L-shaped bracket having a first leg disposed at least partly within the interior volume of the housing and having an aperture disposed in the first leg for receiving the fastening means, the fastening means comprising a screw having an end for engaging a wall of said housing thereby securing said bracket to said housing, a second leg of the bracket disposed within the interior volume of the housing and extending into said volume having a bore for receiving a lock, said screw being received in said first leg in said aperture between said bore and said wall of said housing;

the access cover defining a plane and including a member disposed thereon having a bore therein defining a longitudinal extent, the longitudinal extent of the bore disposed substantially perpendicularly to the plane of the access cover, the bore of the member adapted to receive a lock having locking means thereon, the lock further being received in the bore of the second leg of the bracket in alignment with the bore of the member once the access cover is mounted to the housing, the locking means being received on a side of the second leg of the bracket opposite the member and securing the access cover to the bracket.

2. The apparatus recited in claim 1, wherein the screw comprises a set screw having a pointed end for indenting the housing.

3. The apparatus recited in claim 1, wherein the first leg of the bracket comprises a slotted recess for receiving a wall portion of the housing, the aperture for the screw being disposed so as to intersect said slotted recess.

4. The apparatus recited in claim 3, wherein the access cover is enlarged to accommodate a portion of said bracket adjacent said slotted recess, said portion extending outside said interior volume.

5. The apparatus recited in claim 1, further comprising a plurality of said brackets and a plurality of members mounted on the cover such that the bore of each bracket is in alignment with the bore of the member.

6. The apparatus recited in claim 5, wherein said plurality comprises four, one bracket and respective member being disposed substantially at each corner of the access cover.

7. The apparatus recited in claim 1, wherein the member is welded to the access cover.

8. The apparatus recited in claim 1, wherein each member is cylindrical in shape.

9. The apparatus recited in claim 1, wherein said bore of the member defines a circular opening and the lock comprises a cylindrical lock received in the bore of the member.

10. The apparatus recited in claim 9, wherein said bore of said member has two inner diameters for receiving corresponding outer diameters of said cylindrical lock.

11. The apparatus recited in claim 1, wherein said housing comprises a housing for electrical connections for an electrical utility meter.

12. Apparatus for securely locking an access cover to a housing, the housing defining an interior volume, comprising:

a bracket adapted to be attached at a point substantially within the interior volume of the housing, the bracket including fastening means which are inaccessible from the exterior of the housing once the access cover is mounted to the housing, said bracket comprising an L-shaped bracket having a first leg disposed at least partly within the interior volume of the housing and having an aperture disposed in the first leg for receiving the fastening means, the fastening means comprising a screw having an end for engaging a wall of said housing thereby securing said bracket to said housing, a second leg of the bracket disposed within the interior volume of the housing and extending into said volume and having a bore for receiving a lock, said screw being received in said first leg in said aperture between said bore and said wall of said housing;

an access cover for the housing, said cover defining a plane;

the access cover including a member disposed thereon having a bore therein defining a longitudinal extent, the longitudinal extent of the bore disposed substantially perpendicularly to the plane of the access cover, the bore of the member adapted to receive a lock having locking means thereon, the lock further being received in the bore of the second leg of the bracket in alignment with the bore of the member once the access cover is mounted to the housing, the locking means being received on a side of the second leg of the bracket opposite the member and securing the access cover to the bracket.

13. The apparatus recited in claim 12, wherein the screw comprises a set screw having a pointed end for indenting the housing.

14. The apparatus recited in claim 12, wherein the first leg of the bracket comprises a slotted recess for receiving a wall portion of the housing, the aperture for the screw being disposed so as to intersect said slotted recess.

15. The apparatus recited in claim 12, further comprising a plurality of said brackets and a plurality of members mounted on the cover such that the bore of each bracket is in alignment with the bore of the member.

16. The apparatus recited in claim 14, wherein the access cover is enlarged to accommodate a portion of said bracket adjacent said slotted recess, said portion extending outside said interior volume.

17. The apparatus recited in claim 15, wherein said plurality comprises four, one bracket and respective member being disposed substantially at each corner of the access cover.

18. The apparatus recited in claim 12, wherein the member is welded to the access cover.

19. The apparatus recited in claim 12, wherein each member is cylindrical in shape.

20. The apparatus recited in claim 12, wherein said bore of the member defines a circular opening and the lock comprises a cylindrical lock received in the bore of the member.

21. The apparatus recited in claim 20, wherein said bore of said member has two inner diameters for receiving corresponding outer diameters of said cylindrical lock.

22. The apparatus recited in claim 12, wherein said housing comprises a housing for electrical connections for an electric utility meter.

* * * * *